(12) United States Patent
Iwashita et al.

(10) Patent No.: US 6,579,611 B1
(45) Date of Patent: Jun. 17, 2003

(54) RESIN FILM FOR PRODUCING DECORATIVE LAMINATE AND DECORATIVE LAMINATE CONTAINING THE RESIN FILM

(75) Inventors: Hiroyuki Iwashita, Yamaguchi-ken (JP); Koji Taguma, Yamaguchi-ken (JP); Yoshiyuki Sugimoto, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/857,105

(22) PCT Filed: Jan. 12, 1999

(86) PCT No.: PCT/JP99/06733

§ 371 (c)(1),
(2), (4) Date: Jun. 1, 2001

(87) PCT Pub. No.: WO00/32378

PCT Pub. Date: Jun. 8, 2000

(30) Foreign Application Priority Data

Dec. 1, 1998 (JP) ............................................. 10-342168

(51) Int. Cl.$^7$ .......................... B32B 15/08; B32B 21/08; B32B 19/04; B32B 27/06; B32B 27/36
(52) U.S. Cl. ....................... 428/329; 428/156; 428/323; 428/328; 428/332; 428/339; 428/458; 428/480; 428/481; 428/537.1; 428/702
(58) Field of Search ................................. 428/480, 481, 428/323, 329, 328, 330, 331, 156, 332, 339, 458, 537.1, 689, 702

(56) References Cited

U.S. PATENT DOCUMENTS

| | | | | |
|---|---|---|---|---|
| 4,536,531 A | * | 8/1985 | Ogawa et al. | 524/133 |
| 4,699,942 A | * | 10/1987 | Weaver et al. | 524/100 |
| 4,705,844 A | * | 11/1987 | Espenschied et al. | 528/274 |
| 4,801,640 A | * | 1/1989 | Dallmann et al. | 524/394 |
| 5,032,458 A | * | 7/1991 | Dallmann et al. | 428/423.7 |
| 5,292,471 A | * | 3/1994 | Ito et al. | 264/173.16 |
| 5,701,002 A | * | 12/1997 | Oishi et al. | 235/487 |
| 5,932,320 A | * | 8/1999 | Okajima et al. | 427/412.1 |
| 5,976,676 A | * | 11/1999 | Miki et al. | 428/201 |
| 6,017,612 A | * | 1/2000 | Yoshihara | 156/239 |
| 6,096,410 A | * | 8/2000 | Okajima et al. | 428/195 |
| 6,217,986 B1 | * | 4/2001 | Miki et al. | 428/195 |

OTHER PUBLICATIONS

Abstract, Application No. JP93 141592, "Explosion–protection type battery–has explosion–protection sealing board which is attached to base of casing", Dec. 2, 1994.

Abstract, Application No. JP96 7065, "Explosion protection type sealing plate for airtight secondary battery used in portable electronic device such as video camera, PC—in which thin pad part of explosion protection valve and cutting top plate of metal case are welded together", Jul. 31, 1997.

Abstract, "Gas overpressure relief valve of explosion–proof sealed battery—has two metallic disks having notched grooves or through–holes, welded to opening in battery casing", Nov. 26, 1993.

* cited by examiner

*Primary Examiner*—Vivian Chen
(74) *Attorney, Agent, or Firm*—Browdy and Neimark PLLC

(57) ABSTRACT

A resin film for use in laminating for producing decorative laminates which is equal or superior to conventional polyvinyl chloride resins in suitability for embossing, processability, and long-term water resistance and can be significantly well-designed; and a decorative laminate in which the resin film has been laminated. The resin film is obtained by compounding a polyester resin with 0.5 to 60 wt. % crystallization accelerator having a particle diameter of 0.01 to 5 $\mu$m, forming the mixture into an unstretched film, and embossing at least one side of the film. The resin film is laminated to a metallic or wooden plate, a board, etc. to produce a decorative laminate.

17 Claims, No Drawings

RESIN FILM FOR PRODUCING DECORATIVE LAMINATE AND DECORATIVE LAMINATE CONTAINING THE RESIN FILM

REFERENCE TO RELATED APPLICATIONS

The present application is the national stage under 35 U.S.C. §371 of international application PCT/JP99/06733, filed Jan. 12, 1999 which designated the United States, and which application was not published in the English language.

INDUSTRIAL FIELD

The present invention relates to a resin film for a decorative plate made from a polyester film with crystallization accelerating agent, wherein the film is embossed so as to form a ruggedness pattern at an outer surface of the resin film. The invention also relates to a decorative plate laminated with the resin film.

BACKGROUND OF THE INVENTION

In the prior art, a film made from soft plastic polyvinylchloride resin which is excellent in view of a forming, a design and a chemical resistance, polyolefin resin such as polyethylene and polypropylene, thermoplastic acrylate resin and fluororesins including fluorine, a metal plate covered with biaxial stretching polyester film and so on, a laminated wooden sheet and a MDF are used for an outer plate and an inner part of construction materials, furniture, electric and electronic appliances, sound equipment and business machines.

The polyvinylchloride resin is excellent in characteristics such as economy, embossing and molding. On the other hand, a large amount of plasticizer is added so as to form and mold the resin easily. Therefore, the resin film is too soft and apt to bleed the plasticizer to a surface of the resin film by a long term. In addition, when the resin is burning, toxic substance produced by hydrogen chloride gas is baneful influence to the environment. It becomes a serious problem.

Instead of the polyvinylchloride resin, polyolefin resin mainly including polyethylene resin and polypropylene resin have been considered. Although a single layered film made from these resins has excellent characteristics in view of embossing and chemical resistance, the film is softer than a plastic polyvinylchloride resin. When the resin is laminated on a metal plate and formed, a design is damaged by whitening the formed portions. Although any rubber constituent might be mixed so as to avoid for whitening the portions, the resin becomes as soft as the plastic polyvinylchloride resin.

The thermoplastic acrylate resin and the fluororesins have some useful characteristics, respectively. However, these resins are as soft as the polyvinylchloride resin. Recently, biaxial stretching polyester film mainly including polyethylene terephthalate as a laminate material is paid attention. However, when the resin is embossed, a deep, clear ruggedness pattern can not be formed easily and the design is not so good. Moreover, if some kinds of color pigments are mixed into the resin so as to emphasize the ornament effect, the other characteristics such as forming and water-proof aging would be deteriorated.

To solve the above drawbacks, the present invention provides a resin film laminated on a decorative plate having useful characteristics in view of the embossing, forming, water-proof aging and design, which are more excellent or equal to those of the conventional decorative plate including polyvinylchloride resin.

DISCLOSURE OF THE INVENTION

The present invention provides a resin film laminated on a decorative plate comprising a polyester resin film, wherein crystallization accelerating agent has 0.01 to 5 μm in grain diameter and is included 0.5 to 60 wt % in weight content and at least one surface of the polyester resin film is embossed. The crystallization accelerating agent is pigment. The pigment is one or more kinds selected from a group of carbon-base pigments, titanium-base pigments, azo compound pigments, cyanine-base pigments. The polyester resin film is a polyethylene terephthalate resin film. The resin film is laminated on a metal sheet, a wooden sheet or a board.

BEST MODE FOR CARRYING OUT THE INVENTION

The inventors of the present application have been researched a crystallization and the characteristics of resin films. Then, the inventors found that a crystallization speed of the resin influenced to forming and embossing of the resin.

By improving a crystallization speed, the crystallization of the resin can be promoted and the crystallization growth can be controlled so that the forming can be improved by increasing number of minute crystals without ruining the transparency.

In case of using a decorative plate in water, it is found that a deterioration of the resin could be prevented from promoting. In case of adding minute resin powder having particle sizes in a predetermined range, it was found that the crystallization of the resin was promoted. Thus, the inventors recognized that the minute powder was affected as crystallization accelerating agent.

The present invention is explained hereinafter.
(Used Substrate)

A metal plate such as a steel plate, an aluminum plate, an aluminum alloy plate, a copper plate, a cooper alloy plate, a zinc-or zinc-alloy plating steel plate is used as a substrate of a decorative plate according to the present invention.

Further, a single wooden plate, a laminated wooden plate such as wood veneers and a wood plywood and MDF are also used. Moreover, a plate made from inorganic materials such as a plasterboard, a silicic acid calcium board and an asbestos cement straight board is also used.

The metal plate is an ordinary steel cold rolled steel sheet of 0.10 to 1.2 mm in thickness preferably. An ordinary steel cold rolled steel of 0.10 to 0.50 mm in thickness is more preferable. Among the cold rolled steel, low carbon or extra low carbon aluminum killed steel sheet is preferably used. A non-aging steel sheet in which Nb, Ti or the others are added, a chromium content steel sheet in which chromium of 3 to 18 wt % is included and a stainless steel sheet having various compositions may be used. A surface treated steel sheet which gives surface treatment to the surface of the cold rolled steel sheet may be used. Plating and a conversion treatment and painting processing can be considered as the surface treatment. As plating, zinc-plating, zinc-aluminum alloy plating, zinc-cobalt-molybdenum plating, tin plating, nickel plating, chromium plating, nickel-phosphorous plating, nickel-zinc plating, nickel-cobalt plating, nickel-tin plating and aluminum plating can be considered. As a conversion treatment, chromate treatment and phosphate treatment and the other well-known methods can be considered. As coating process, various paints may be coated or baked responding to the characteristics.

(Used Resin Film)

A film comprising crystal resin is necessary as a resin film for a decorative laminated resin film according to the present invention. Especially, polyethylene terephthalate, polybutylene terephthalate, and a copolymer of polyethylene terephthalate and polybutylene terephthalate and other polyester resins may be used. For instance, one of terephthalic acids is used and the copolymerization body replaced with isophthalic acid and adipic acid, etc may be used. Further, one of butanediol is used and the copolymerization body replaced with ethylene glycol etc. may be used. Moreover, two kinds or more of the above mentioned blend resins are used. In addition, two kinds or more of laminated filmsmade from the above mentioned resins may be used as a compound resin film. It is desirable that a thickness 20 to 300 μm preferable, and especially 70 to 200 μm.

(Crystallization Accelerating Agent Included in a Resin Film)

A resin film laminate on a decorative plate in the present invention is a film made from a crystalline resin including crystallization accelerating agent. As minute powder for promoting resin crystallization, pigments ordinary used for paints can be used. For instance, one or two more kinds of pigments selects from a group comprising carbon-base pigments such as carbon blacks, titanium-base pigments such as titanium white and titanium yellow, inorganic pigments such as red iron oxide, lead white, ultra marine blue pigment, cadmium yellow, azo compound pigments such as parared, cyanine-based pigments such as phthalocyanine blue and anthraquinone may be used.

The crystallization accelerating agent such as the above described pigments is utilized as minute powder of which diameter is 0.01 to 5 μm. The diameter is more preferably 0.01 to 0.5 μm. The minute powder is contained in the resin by 0.5 to 60 wt %. It is more preferable 3 to 40 wt %. Even if a grain diameter of minute powder is less than 0.01 μm, improvable effects of crystallization is saturated. On the other hand, if a grain diameter of minute powder is larger than 5 μm, the powder is likely to become the starting point of cracking when some impact is loaded on the resin film.

In case of including the above powder by less than 0.5 wt %, a sufficient crystallization effect can not be found. On the other hand, in case of including the above powder by more than 60 wt %, a film production becomes remarkably difficult.

A resin which is excellent in view of forming, embossing quality, water-proof quality (deterioration degree of water-proof quality) can be obtained by containing the above powder in a preferable range (wt %).

(Method for Embossing)

As a method for embossing the above polyester resin film, there is a method in which a hot melt resin is extruded from a T-die on a rugged casting roller so as to form a film of which one side is embossed. Another method employs a step for directly passing a film through a pair of chilled rollers. Another method employs a step for heating a resin and passing the film through a pair of chilled rollers. Another method employs a step for passing a film through a rotary screen roller and sucked by vacuum so as to emboss. Another method employs a hot needle process, that is, a step for passing a film through a perforator or a step for compressing a film with a stamp roller. An embossing process according to the present invention may employ anyone of the methods described above. Further, the embossing process may employ a step of laminating the polyester resin film on a substrate, heating the substrate in a range of a resin melting point ±10° C., and embossing the resin by compressing with a stamp roller.

An embossing form may be a random mat, a square, a diamond type, a deep drawing type and a grain. These patterns can be selected depending on a product.

(Laminating Method)

The embossed polyester resin film in accordance with the above method is laminated on a substrate by a well known thermal fusing method. In case of a metal substrate, the metal plate is heated to a temperature higher than a melting point of a polyester resin, contacted with a non-embossed surface of the polyester resin. Both are sandwiched by a pair of laminate roller, and rapidly cooled in water. In case of high adhesive strength required with respect to a metal substrate, an adhesive layer is provided on the polyester resin or the metal substrate so as to laminate the metal plate and the polyester resin film through the adhesive layer.

In case of a wood plate or a board, an adhesive layer is provided on a polyester resin film or a substrate so as to laminate the substrate and the polyester resin film through the adhesive layer.

General adhesive agent may be utilized for an adhesive layer for boding a polyester resin film and a substrate. For instance, an emulsion type adhesive agent such as vinyl acetate resin system, ethylene vinyl acetate resin system, urea resin system and urethane resin system, etc may be used. These are safe compounds with the fire, non-stench, cheap in the price.

(Judgement of Embossing Quality)

Embossing quality of the polyester resin film according to the present invention is judged by a surface roughness (Ra: μm) of a resin film after embossing. In the present invention, the surface of the resin film is observed by naked eyes and the embossing quality is evaluated by the standard of the undermentioned three stages:

Excellence: ○

Little Defective: △

Defect: X

The above evaluation standard is judged by measuring the surface roughness of the polyvinylchloride resin film with a surface roughness measurement machine (SURFCOM) manufactured by TOKYO SEIMITSU K.K. in accordance with JIS B0601. In the measurement method, the surface roughness of 4 μm is judged as an acceptance standard of the embossing quality. The standard of "excellence" is judged as a case that the surface roughness of the measured resin film is more excellent or equal to the surface roughness of a polyvinylchloride resin film of 4 μm. The standard of "little defective" is judged as a case that the surface roughness of the measured resin film is not more excellent than that of polyvinylchloride resin film of 4 μm but is no problem in a practical use. The standard of "defect" is judged as a case that the surface roughness of the measured resin film has problems in a practical use.

(Evaluation of Forming)

A polyester film having a predetermined length and width and a thickness of 0.10 mm is embossed by passing through a rugged grain stamping roller of which the surface average roughness Ra is 11 μm at a constant speed. Then, the polyester resin film is heated to a temperature higher than the melting point. A zinc-plating steel plate having the same length and width with the polyester resin film and a thickness of 0.50 mm is contacted with the heated polyester resin film and the polyester resin film and the sheet are compressed by a pair of rollers so as to put on a specimen.

The specimen impact loaded by the above described process is examined with Dupon shock testing machine (0.5 inch in an outer diameter of the impact part, 1 kg in weight, and 50 cm in the fall height of the impact part) in accordance with JIS K5400. The result is evaluated by three stages by naked eye observation as described below.

◯: No crack is generated

Δ: Fine cracks are generated partically in the resin film

X: Cracks are generated at the whole embossed parts of the resin film

In the above points in the evaluation, neither ◯ nor Δ have any problem in use. The examination is executed ten specimens.

(Evaluation of Water-proof Deterioration)

Water-proof deterioration of the polybutylene terephthalate resin film according to the present invention touched water for a long time is evaluated by the Dupon impact test method for imaging the resin film with the embossing finish leaving for a long time in the high humidity and high temperature condition (for example, a resin film as an interior material of a unit bath).

A polyester resin film having a predetermined length and width and a thickness of 0.10 mm is embossed by passing through a rugged grain stamping roller of which the surface average roughness Ra is 11 μm at a constant speed. Then, the polyester resin film is heated to a temperature higher than the melting point. A zinc-plating steel sheet having the same length and width with the polyester resin film and a thickness of 0.50 mm is contacted with the heated polyester resin film and the polyester resin film, and the sheet are compressed by a pair of rollers so as to put on a specimen. The specimen is cut out to the size of 60 mm×60 mm. A cut-out piece is soaked in ion exchanger water maintained in a temperature of 38±2° C. for one month and dried at the room temperature. Impact is loaded on the piece by Dupon impact test machine under the condition in accordance with JIS K 5400 (0.5 inch in outer diameter of impact portion, 1 kg in weight, 50 cm in fall height of the impact part). The resin film after impacting is observed through naked eyes and evaluated by five stages as follows:

5: No crack is generated.

4: Fine cracks are partically generated in the resin film.

3: Fine cracks are generated at the whole embossed portion of the resin film.

2: Large cracks are generated at the whole embossed portion of the resin film.

1: The whole resin film is remarkably cracked.

In the above points in the evaluation, the points 5 and 4 have no problem in use. The examination executed ten specimens.

EXAMPLE

Examples of the present invention will be described in detail hereinafter.

Example 1

Polyethylene terephthalate resin and pigments as shown in Table 1 having a content as shown in Table 1 are mixed and extruded so as to form a non-oriented film having a thickness of 0.10 mm by an extruder. While the film is formed, hot melted resin is extruded from the T-die on a rugged casting roller on which the surface average roughness Ra is 11 μm with a grain and the embossing is operated on one side surface of the resin film. On the contrary, polybutylene terephthalate resin having a quicker crystallization speed is extruded from an extruder so as to form a non-oriented film having a thickness of 0.10 mm of which one side surface is embossed as similar as the polyethylene terephthalate resin without pigment as a comparative example. Embossing quality of the embossed resin films is observed by naked eyes. The result of the evaluation is a shown in Table 1.

Example 2

A resin film embossed in the same condition of the example 1 is laminated on a metal sheet by a method as described below. The metal sheet is low carbon cold rolled steel sheet having a thickness of 0.50 mm with a zinc-plating layer having a thickness of 0.002 mm.

The zinc-plating steel sheet is heated to 280° C. and a non-embossed surface of the polyethylene terephthalate resin film is contacted with the zinc-plating steel sheet. The both are compressed by a pair of laminate rollers and rapidly cooled by immersing into water. Thus, a zinc-plating steel sheet covered with a polyethylene terephthalate resin film can be obtained.

On the other hand, a zinc-plating steel sheet having the same figure is heated to 240° C. and a non-embossed surface of the polybutylene terephthalate resin film is contacted with the zinc-plating steel. The both are compressed by a pair of laminate rollers and rapidly cooled by immersing into water. Thus, a zinc-plating steel sheet covered with a polyethylene terephthalate resin film can be obtained.

Regarding the above described zinc-plating steel sheets covered with polyethylene terephthalate resin film or polybutylene terephthalate resin film, processability of the resin films are evaluated by the Dupon impact test machine under the condition in accordance the JIS K 5400. The result of the evaluation is shown in Table 1.

Specimens having a size 60 mm×60 mm are cut out from the both zinc-plating steel sheet covered with the respective resins, immersed into ion exchange water maintained in the temperature of 38±2° C. for one month and dried at the room temperature so as to evaluate water-proof deterioration of the resin film. The result of the evaluation is shown in Table 1.

Example 3

The resin film embossed under the same condition of the example 1 is laminated on a wooden board as described below. Polyurethane system adhesive agent (coating weight: 50 g/m$^2$) is coated on a wooden board having a thickness of 6 mm. The polyethylene terephthalate resin film is heated to 180° C. and compressed under the adhesive pressure (15 kgf/cm$^2$) for 20 seconds so as to obtain a laminated wooden board covered with the polyethylene terephthalate resin film.

Polyurethane system adhesive agent (coating weight: 50 g/m$^2$) is coated on a wooden board having the same condition as described above and the polybutylene terephthalate resin film is heated to 160° C. and adhered under the pressure (15 kgf/cm$^2$) for 20 seconds so as to obtain a laminated wooden board covered with the polybutylene terephthalate resin film.

Example 4

A resin film having the same condition of the example 1 is laminated on a sheet by a method as described below. Polyurethane system adhesive agent (coating weight: 80 g/m$^2$) is coated on a plaster board of 8 mm in thickness and the polyethylene terephthalate resin film is adhered on the board by heating to 180° C. under the adhesive pressure of 15 kgf/cm$^2$ for 25 seconds so as to obtain a plaster board covered with the polyethylene terephthalate resin film.

Polyurethane system adhesive agent (coating weight: 80 g/m$^2$) is coated on a plaster board having the same condition and the polybutylene terephthalate resin film is adhered on the board by heating to 160° C. under the adhesive pressure of 15 kgf/cm² for 25 seconds.

The result of the evaluation is shown in Table 1. The polyethylene terephthalate resin film with pigment has embossing quality, forming and water-proof deterioration as same as the level of the polybutylene terephthalate resin film having quicker crystallization speed.

TABLE 1

| SPECIMEN No. | Resin film kind | Crystallization accelerating agent (pigment) | | | Evaluation of characteristics | | | Example or comparative deterioration example |
|---|---|---|---|---|---|---|---|---|
| | | color | Grain Diameter (μm) | Content (wt %) | Embossing quality | Water-proof Forming | | |
| 1 | PET | Carbon black Black | 0.01 | 0.5 | Δ | ○ | 4 | Example |
| 2 | PET | Carbon black Black | 0.023 | 3 | ○ | ○ | 4 | Example |
| 3 | PET | Carbon black Black | 0.030 | 5 | ○ | ○ | 5 | Example |
| 4 | PET | Cyanine blue Blue | 0.050 | 3 | ○ | ○ | 4 | Example |
| 5 | PET | Titanium white White | 0.25 | 20 | ○ | ○ | 5 | Example |
| 6 | PET | Titanium white White | 0.16 | 30 | ○ | ○ | 5 | Example |
| 7 | PET | Titanium white White | 0.22 | 40 | ○ | ○ | 5 | Example |
| 8 | PET | Parared Red | 0.30 | 60 | ○ | Δ | 4 | Example |
| 9 | PET | Titanium yellow Yellow | 0.20 | 10 | ○ | ○ | 5 | Example |
| 10 | PET | Ultra marine blue Ultra blue | 5.0 | 5 | ○ | ○ | 4 | Example |
| 11 | PET | None | — | — | Δ | ○ | 1 | comparative example |
| 12 | PBT | None | — | — | ○ | ○ | 5 | comparative example |

PET: polyethylene terephthalate
PBT: polybutylene terephthalate

POSSIBILITY OF USE IN THE INVENTION

The polyester resin film including crystallization accelerating agent according to the present invention has the embossing quality as equal to that of the polyvinylchloride resin film.

A decorative plate laminated with the polyester resin film has beautiful tone and is excellent in the design. The forming and the water-proof deterioration of the resin film is superior so that the resin film is applicable to construction material required water resistance such as a unit bath.

What is claimed is:

1. A resin film laminated on a decorative plate comprising a non-oriented polyester resin film containing a crystallization accelerating agent having a grain diameter of 0.01 to 5 μm and included in an amount of 0.5 to 60 wt %,
   wherein at least one surface of the polyester resin film is embossed, and wherein said plate comprises a metal sheet, a wooden sheet, or a board made from inorganic materials.

2. A resin film laminated on a decorative plate as claimed in claim 1, wherein said crystallization accelerating agent is a pigment.

3. A resin film laminated on a decorative plate as claimed in claim 2, wherein said pigment is one or more kinds selected from the group consisting of carbon-containing pigments, titanium-containing pigments, azo compound pigments, and cyanine-containing pigments.

4. A resin film laminated on a decorative plate as claimed in claim 1, wherein the resin film is laminated on a metal sheet.

5. A resin film laminated on a decorative plate as claimed in claim 1, wherein the resin film is laminated on a wooden sheet.

6. A resin film laminated on a decorative plate as claimed in claim 1, wherein the resin film is laminated on a board.

7. A resin film laminated on a decorative plate as claimed in claim 2, wherein the resin film is laminated on a metal sheet.

8. A resin film laminated on a decorative plate as claimed in claim 2, wherein the resin film is laminated on a wooden sheet.

9. A resin film laminated on a decorative plate as claimed in claim 2, wherein the resin film is laminated on a board.

10. A resin film laminated on a decorative plate as claimed in one of claims 1 to 3, wherein said polyester resin film is a polyethylene terephthalate resin film.

11. A resin film laminated on a decorative plate as claimed in claim 10, wherein the resin film is laminated on a metal sheet.

12. A resin film laminated on a decorative plate as claimed in claim 10, wherein the resin film is laminated on a wooden sheet.

13. A resin film laminated on a decorative plate as claimed in claim 10, wherein the resin film is laminated on a board.

14. The resin film according to claim 1 wherein the polyester resin film is a film of polybutylene terephthalate or a film of a copolymer of polyethylene terephthalate and polybutylene terephthalate.

15. A resin film laminated on a decorative plate comprising
   a non-oriented polyester resin film containing an additive consisting essentially of a crystallization accelerating agent having a grain diameter of 0.01 to 5 μm and included in an amount of 0.5 to 60 wt %, wherein at least one surface of the polyester resin film is embossed, and wherein said plate comprises a metal sheet, a wooden sheet, or a board made from inorganic materials thickness.

16. The resin film of claim 15 laminated to a steel sheet, wherein said steel sheet is selected from the group consisting of cold rolled steel sheet of 0.10 to 0.50 mm in thickness, non-aging steel sheet containing at least one of Nb and Ti, steel sheet containing 3–18 wt % chromium, and surface treated steel sheet, wherein said polyester film has a thickness of 70–200 $\mu$m, and wherein said crystallization accelerating agent has a particle diameter of 0.01–0.5 $\mu$m and is present in an amount of 3–40 wt %.

17. The resin film laminated on a decorative plate according to claim 14 wherein the polyester resin film is a film of a copolymer of polyethylene terephthalate and polybutylene terephthalate, and the crystallization accelerating agent is selected from the group consisting of one or more of carbon black, titanium dioxide, iron oxide, lead white, ultra marine blue, cadmium yellow, an azo compound, phthalocyanine blue, and anthraquinone.

* * * * *